Patented Aug. 29, 1950

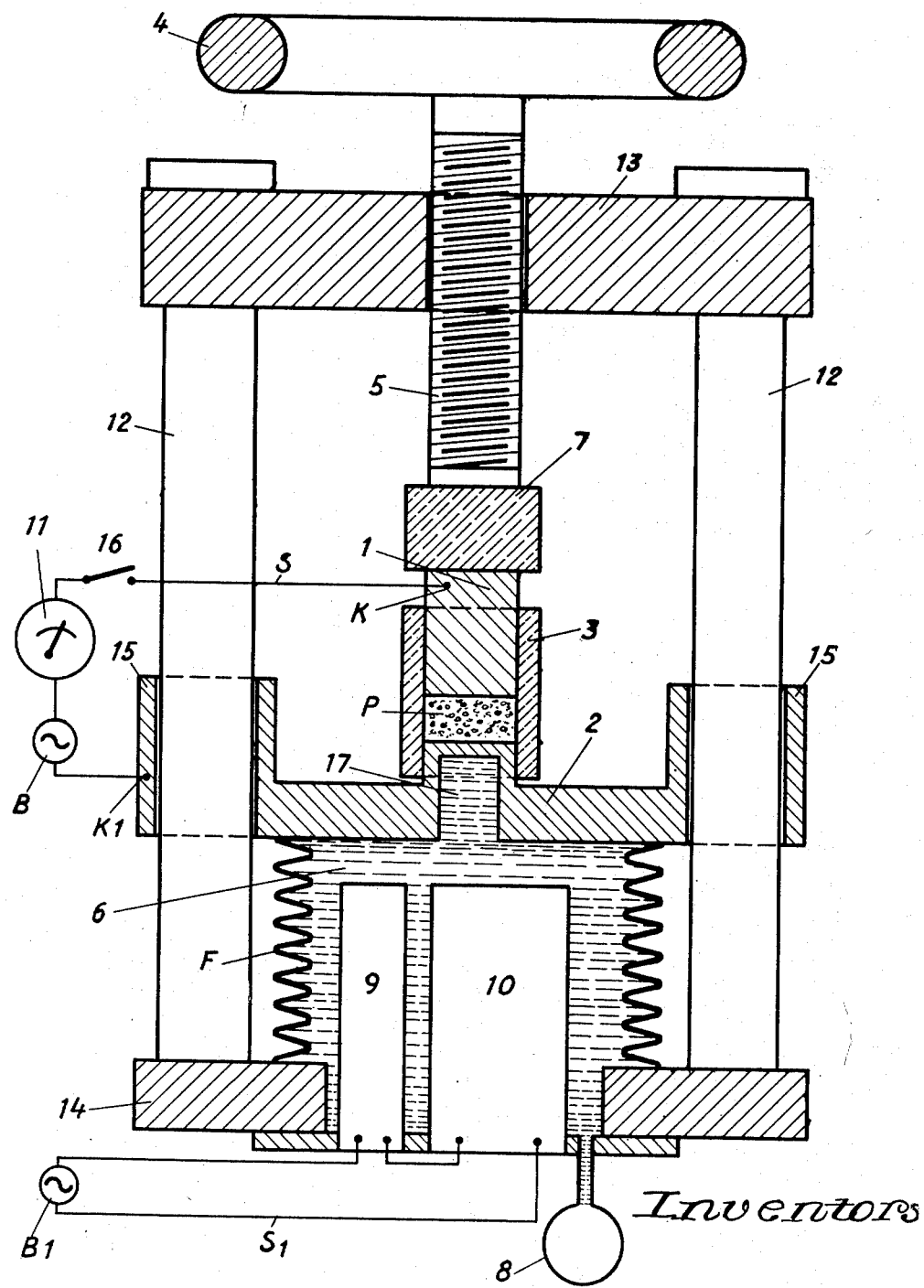

2,520,394

UNITED STATES PATENT OFFICE 2,520,394

APPARATUS FOR DETERMINATION OF MOISTURE CONTENT

Britta Franzén-Lutz and Joseph Peter Lutz, Appelviken, Sweden, assignors to Telefonaktiebolaget L M Ericsson, Stockholm, Sweden, a company of Sweden Application December 30, 1946, Serial No. 719,220
In Sweden May 31, 1944

Section 1, Public Law 690, August 8, 1946
Patent expires May 31, 1964

2 Claims. (Cl. 175—183)

The invention relates to a method and an apparatus for determination of the moisture contents of at least partly hygroscopic substances reduced to small particles or granules, e. g. wheat and its products, dried milk, lignite, peat, pulp etc., by means of electrical measurement of resistance. Hitherto known methods and apparatuses of this kind have been so unsatisfactory that, in spite of the great need of such measurements, an application on a larger scale has been impossible. This is due to the fact that the quality of the measuring substance most often is unequal and that the appearance of the crushing surfaces is varying. As particularly organic substance consists of layers which are unequally hygroscopic, the measured electrical resistance will not have a single-valued relation to the moisture contents. The results of the measurement are further very dependent on the temperature of the samples. Even at those variations of temperature (±3-5°) which appear in the laboratory chamber disturbing measuring faults occur.

The present invention has for an object to attain a single-valued relation between the electrical resistance measured on the apparatus and the moisture contents of the sample. The invention also relates to a hydraulic press making possible that the temperature of the sample in a simple manner may be kept constant. The applicant has through experiments found that if—before and during the measurement of resistance of the sample—this is exposed to a sufficiently high pressure with a constant temperature, the electrical resistance and consequently the moisture values will be sufficiently independent of the fineness of grain of the measuring substance and the unequal distribution of the hygroscopic layers. It has been proved that the necessary pressures are dependent on the measuring substance. For instance wheat, whole or bruised, at 50 atmospheres and more gave a resistance which was independent of the fineness of grain. On using samples of peat and ground pulp a lower pressure might be sufficient. Said compression also facilitates the tempering of the sample. The tempering of a sample will namely take place considerably more easily and swiftly if it has before been compressed to a high density than without the application of such a high compression.

The invention will be more closely described with reference to the annexed drawing, which in section shows a hydraulic press for measurement of the moisture contents. The hydraulic press comprises a frame consisting of two vertical standards 12 and a bar 13 and a bottom plate 14 and two movable press plungers 1, 2, between which the sample P is enclosed in a tubular measuring cell 3 of electrically insulating material. The plunger is operated by means of a spindle 5 being threaded in the bar 13 and provided with a handwheel 4 and the plunger 2, being connected with the bottom plate 14 by means of a bellows 5 and provided with a recess 17 for the pressure oil, is slidable in two bearings 15 along the standards 12, and is influenced by the pressure oil of a pressure chamber 6. This pressure oil will thus exert as great a pressure on the plunger 2 as the spindle 5 exerts on the plunger 1. The hydraulic pressure in the pressure chamber may instead be produced by means of a pump, in which case it is not necessary to make the plunger 1 movable.

The plunger 1 is, by means of a member 7 of insulating material, separated electrically from the spindle 5. The pressure in the pressure chamber may be measured by means of a pressure gauge 8. A measuring circuit S, containing a source of current B and a switch 16, is connected to the plungers 1 and 2 at the points k and k₁, said plungers thus constituting electrodes for the measurement of resistance. In the pressure oil there is also an electrical heating device 9 and an adjustable thermostat 10 keeping the pressure oil at a constant temperature, e. g. about 30° C. 9 and 10 are fed from a source of current B₁ over the circuits S₁. As the plunger 2, due to a recess 17, has a great contact surface against the oil, the temperature of the oil is easily imparted to the plunger 1 and when the plunger 2 during the measuring intervals rests against the plunger 1 also the plunger 2 swiftly gets the temperature of the oil. Through this also the two plungers 1, 2, consisting of brass or another material having good heat conducting properties, get a constant temperature. As these metallic parts have a very great heat capacity in relation to the sample they are maintaining constant temperature during the measurement. The time, which the measurement itself demands, is in practice rather short about 1 minute for wheat, simultaneously as the intervals between two measurements are relatively long. The temperature of the sample will practically not be changed during the measurement, especially as the constant temperature as a rule is chosen so that it is not very different from the temperature of the surrounding room. Regarding the value of the temperature the same value as that for which the apparatus has been calibrated shall of course be used.

A condition precedent for measurement of a certain kind of substance is of course that the pressure needed to make the electrical resistance independent of the fineness of grain and the quality of the crushing surfaces should be found out beforehand. This pressure is found out empirically, at a temperature which suitably lies somewhat above the temperature of the room, e. g. 30° C., by taking a number of samples of one and the same material, the samples having the same moisture contents but different fineness of grain. Each of these samples is then exposed to a certain pressure, e. g. 10 atmospheres, at the stated temperature 30°, and the resistance of each sample is measured. If thereby the resistances of the samples should differ from each other, the measurement of resistance of the samples is renewed at an increased pressure, e. g. 20 atmospheres. One continues in this manner to measure the resistance of the samples at increased pressures until at a certain pressure the resistances of all the samples are the same. Then it is evident that at this certain pressure the electrical resistance is independent of the fineness of grain and that a single-valued connection is at hand between resistance and moisture contents.

The underlying theoretical basis for this change in the sample, produced by the pressure, is not entirely known, but it is evident that the proportion of water in the grains of the sample changes inasmuch as the normally hygroscopic particles are giving off water, which the rest of the substance is supplied with, until said proportion of water becomes completely uniform.

The method for determination of the moisture contents in a sample of a certain material is the following: By means of the handwheel 4 the plunger 1 is screwed up so highly that the sample P may be inserted into the tubular measuring cell 3. The plunger 1 is then screwed down until the pressure gauge 8 indicates such a value that the proper pressure is obtained. The sample is left at this pressure for approximately one minute, during which period its structure and temperature become uniform throughout. If the pressure has dropped at the expiration of the minute it must be readjusted to the proper value. Then the switch 16 is closed, which connects the sample to the measuring instrument 11. The reading taken on the instrument 11 is converted into moisture contents by means of calibration tables for the material in question. By means of the handwheel 4 the plunger 1 is then screwed up and the sample 1 moved away and then the plunger 1, to avoid the cooling of the electrodes, is brought down in metallic connection with the plunger 2, the apparatus thus being ready for the next test.

The necessary pressure may of course, instead of in a hydraulic manner, be produced in any other arbitrary way, for instance pneumatically, but the hydraulic press now described has proved to be very well adapted for its purpose as the pressure liquid is used partly for producing the necessary pressure and partly for maintaining the constant temperature of the sample.

We claim:

1. Apparatus for determination of the moisture content of a sample of at least partly hygroscopic substance reduced to small particles or granules by measurement of the electrical resistance of said sample, comprising a tubular measuring member for containing said sample, two electrodes for the measurement of said resistance, said electrodes being electrically insulated from each other and consisting of a material having good heat conducting properties and high heat capacity, at least one of said electrodes being constituted by a plunger projecting into one end of said tubular member, means for pressing at least one of said electrodes against said sample with a pressure of such a value that the electrical resistance is independent of the fineness of grain and the distribution of the hygroscopic layers, means for heating at least one of said electrodes, and thermostatic means for controlling said heating means so as to maintain said electrode at a constant temperature with relation to the ambient temperature.

2. Apparatus for determination of the moisture contents in a sample of at least partly hygroscopic substance reduced to small particles or granules by measurement of the electrical resistance of said sample, comprising a tubular measuring member for containing said sample, two electrodes for the measurement of said resistance, said electrodes being electrically insulated from each other and consisting of a material having good heat conducting properties and high heat capacity, at least one of said electrodes being constituted by a plunger projecting into one end of said tubular member, an hydraulic press for pressing at least one of said electrodes against said sample with a pressure of such a value that the electrical resistance is independent of the fineness of grain and the distribution of the hygroscopic layers, means for heating the pressure liquid of said hydraulic press, and a thermostatic means immersed in said pressure liquid and controlling said heating means so as to maintain said electrode at a constant temperature with relation to the ambient temperature.

BRITTA FRANZÉN-LUTZ.
JOSEPH PETER LUTZ.

REFERENCES CITED

The following references are of record in the file of this patent:

UNITED STATES PATENTS

| Number | Name | Date |
|---|---|---|
| 2,063,840 | Fairchild et al. | Dec. 8, 1936 |
| 2,082,364 | Store | June 1, 1937 |
| 2,217,626 | Strang | Oct. 8, 1940 |
| 2,343,340 | Stevens | Mar. 7, 1944 |